United States Patent [19]
Owaki

[11] Patent Number: 5,745,474
[45] Date of Patent: Apr. 28, 1998

[54] APPARATUS AND METHOD FOR REPRODUCING DATA FROM DISK, METHOD FOR RECORDING DATA ON DISK AND DISK

[75] Inventor: Hidetaka Owaki, Tokyo, Japan

[73] Assignee: Sega Enterprises, Ltd., Japan

[21] Appl. No.: 730,629

[22] Filed: Nov. 4, 1996

Related U.S. Application Data

[63] Continuation of Ser. No. 379,592, filed as PCT/JP94/00897 Jun. 3, 1994, published as WO94/29789 Dec. 22, 1994, abandoned.

[51] Int. Cl.$^6$ ............................................. G11B 7/00
[52] U.S. Cl. ...................... 369/275.3; 369/58; 369/59; 369/47; 360/48
[58] Field of Search ............................. 369/58, 54, 59, 369/47, 48, 49, 32, 275.3, 275.2; 360/40, 48, 50

[56] References Cited

U.S. PATENT DOCUMENTS 5,432,768  7/1995  Terashima et al. .................. 369/58
5,436,878  7/1995  Yamaguchi et al. ................. 369/58 X

FOREIGN PATENT DOCUMENTS

| | | |
|---|---|---|
| WO 84/03792 | 9/1984 | Australia . |
| 51876/93 | 6/1994 | Australia . |
| 133706 | 8/1984 | European Pat. Off. . |
| 473305 | 3/1992 | European Pat. Off. . |
| 473390 | 3/1992 | European Pat. Off. . |
| WO 92/12515 | 7/1992 | European Pat. Off. . |
| 57-111757 | 7/1982 | Japan . |
| 2-132515 | 5/1990 | Japan . |

*Primary Examiner*—Muhammad N. Edun
*Attorney, Agent, or Firm*—Dickstein Shapiro Morin & Oshinsky LLP

[57] ABSTRACT

An apparatus for reproducing data recorded on a disk (10) has a head part (12) for reading data from the disk, storage parts (17, 18) for storing the data read by the head part, and a control part (15) which pre-reads the data from the disk and stores the pre-read data to the storage parts so that the reproducing apparatus can output the data continuously to the outside during the seeking operation of the head part, and controls the outputting of the data from the storage parts to the outside.

6 Claims, 13 Drawing Sheets

FIG.11
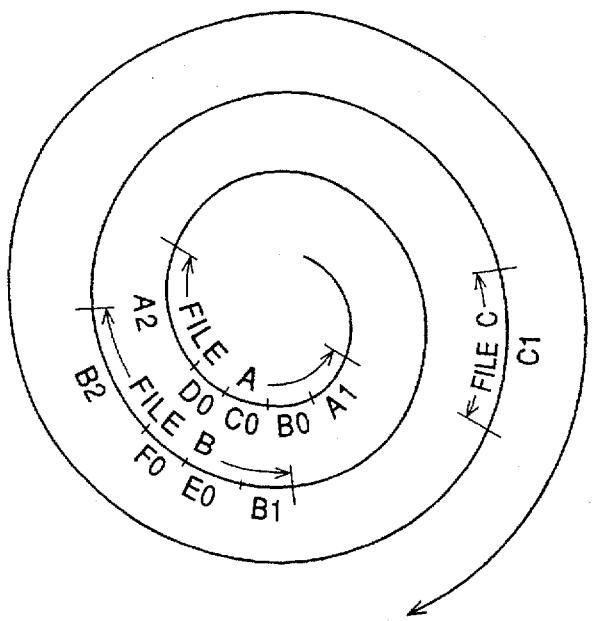
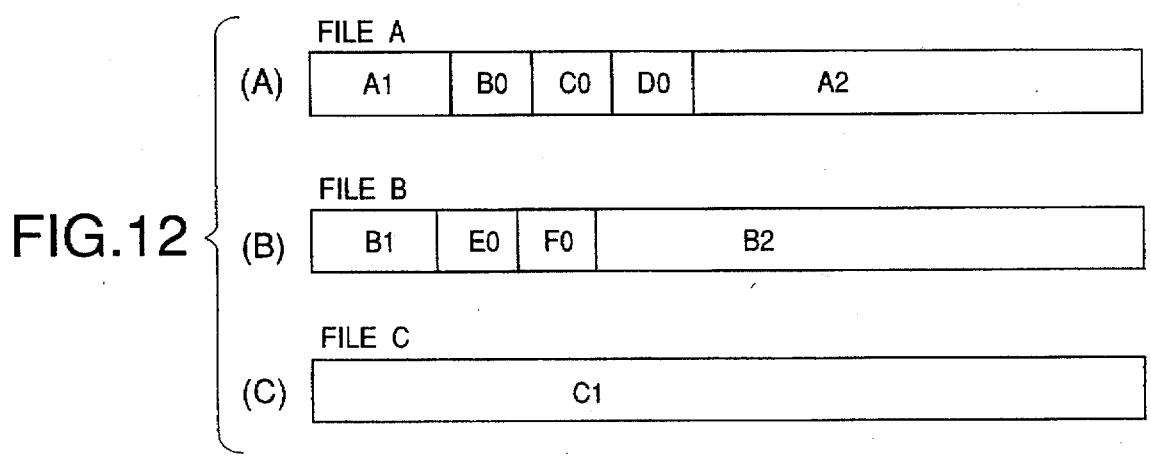
FIG.12

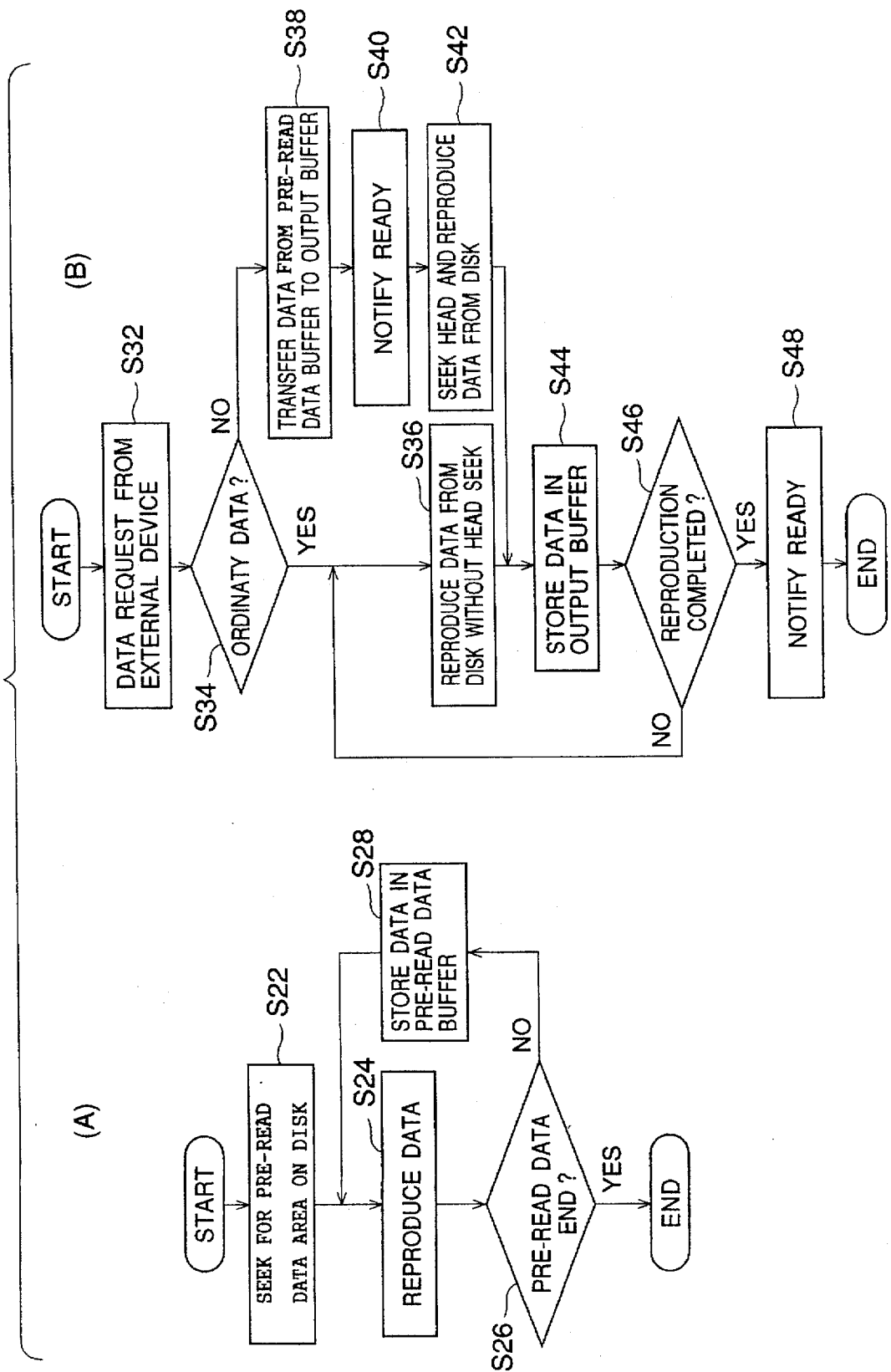

APPARATUS AND METHOD FOR REPRODUCING DATA FROM DISK, METHOD FOR RECORDING DATA ON DISK AND DISK

This application is a continuation of application Ser. No. 08/379,592, filed as PCT/JP94/00897 Jun. 3, 1994, published as WO94/29789 Dec. 22, 1994, now abandoned.

TECHNICAL FIELD

The present invention relates to a disk reproducing apparatus, and more particularly to an apparatus and method for reproducing data from a disk, a method for recording data on a disk, and a disk.

BACKGROUND ART

Conventionally, a game using an apparatus for reproducing data from a disk is played so that data regarding a game, such as video and sound, is recorded on a CD-ROM (Compact Disk Read Only Memory), an LD-ROM (Laser Disk Read Only Memory) or the like and is reproduced therefrom in the progress of the game.

Conventionally, data regarding a driving game is recorded as follows. As shown in FIG. 1, if a route AB branches out into a route BC and BD, data regarding the routes AB and BC are recorded on the CD-ROM according to sequential address values so that the above data can be sequentially reproduced, and data regarding the route BD is recorded thereon according to address values discontinuous to those for the route AB.

In a conventional apparatus for reproducing data from a disk, if the route BC is continuously selected after the route AB, the video and sound of the game can be continuously reproduced because the data regarding the route BC is recorded according to the address values continuing to those for the route AB. However, if the route BD is continuously selected after the route AB, a seek operation is needed in which an optical head is moved, after reproducing the data regarding the route AB, to the address in which data regarding the route BD is recorded. Hence, video and sound are interrupted or stopped during the interval between the completion of reproduction of the data regarding the route AB and the commencement of reproduction of the data regarding the route BD.

The present invention was made taking into account the above, and has an object of providing an apparatus and method for reproducing data from a disk, a method for recording data on a disk, and a disk in which the outputting of data is not interrupted but can be continuously carried out during a seek operation of a head for reading data regarding a branching part.

DISCLOSURE OF THE INVENTION

The present invention is a disk reproducing apparatus for reproducing data recorded on a disk comprising head means for reading the data from the disk, storage means for storing the data read by the head means, and control means for pre-reading data from the disk and storing the pre-read data to the storage means so that the apparatus can output data continuously to an outside thereof during a time when the head means is in a seek operation and for controlling outputting of data from the storage means to the outside of the apparatus.

Also, the present invention is a disk reproducing method for reproducing data from a disk comprising a first step of pre-reading data from the disk and storing the pre-read data in a memory so as to make it possible to continue to output data during a time when a head is in a seek operation and a second step of externally outputting the data from the memory.

Further, the present invention is a disk recording method for recording data on a disk comprising, a first step of recording sequential data on the disk, a second step of recording data on a recording area located in a position discontinuous to the recorded part on which the sequential data is recorded, and a third step of recording, on a predetermined recording area, data which forms a beginning part to be followed by the data recorded on the recording area located in the discontinuous position and which is to be read in advance of reading the data recorded in the second step.

Furthermore, the present invention is a disk for recording data comprising, a first recording area on which sequential data is recorded, a second recording area located in a position discontinuous to the first recording area on which the sequential data is recorded, and a third recording area for recording data regarding a beginning part to be followed by data recorded on the second recording area and to be read in advance of reading the data from the second recording area.

BRIEF DESCRIPTION OF THE DRAWINGS

FIG. 11 is a diagram for explaining a recording formation used when the course shown in FIG. 10 is displayed according to the first embodiment of the present invention;

FIG. 12 is a diagram showing file data recording in the recording formation shown in FIG. 11;

FIG. 14 is a flowchart of a process executed by the control block shown in FIG. 3 according to the second embodiment of the present invention;

BEST MODE FOR CARRYING OUT THE INVENTION

Figure 1:
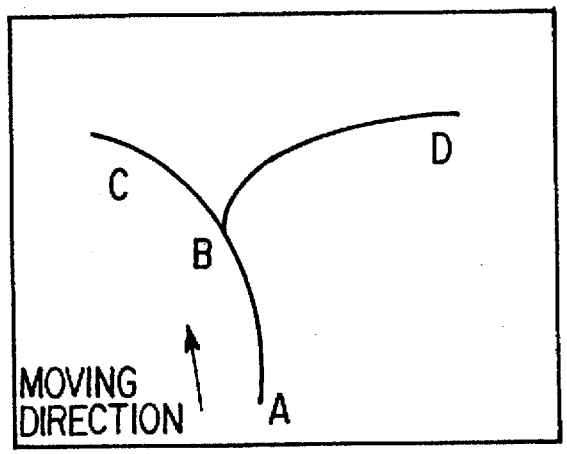
FIG. 1 is a diagram for explaining an example of a course displayed on a screen in a play of a driving game.
Figure 2:
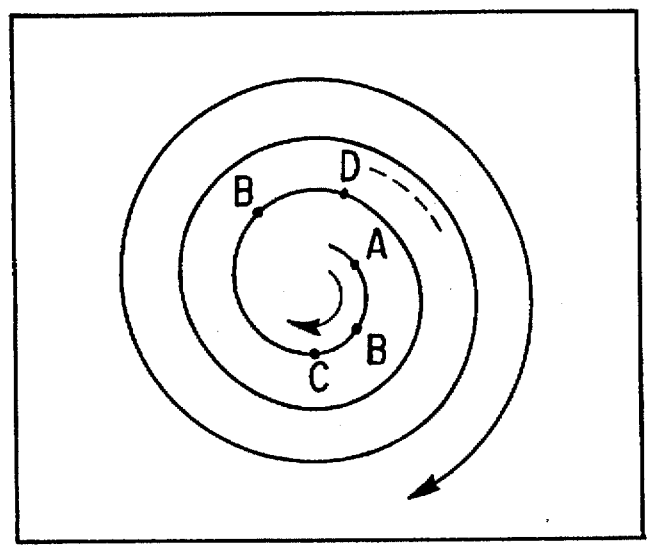
FIG. 2 is a diagram for explaining a conventional recording formation on a disk.
Figure 3:
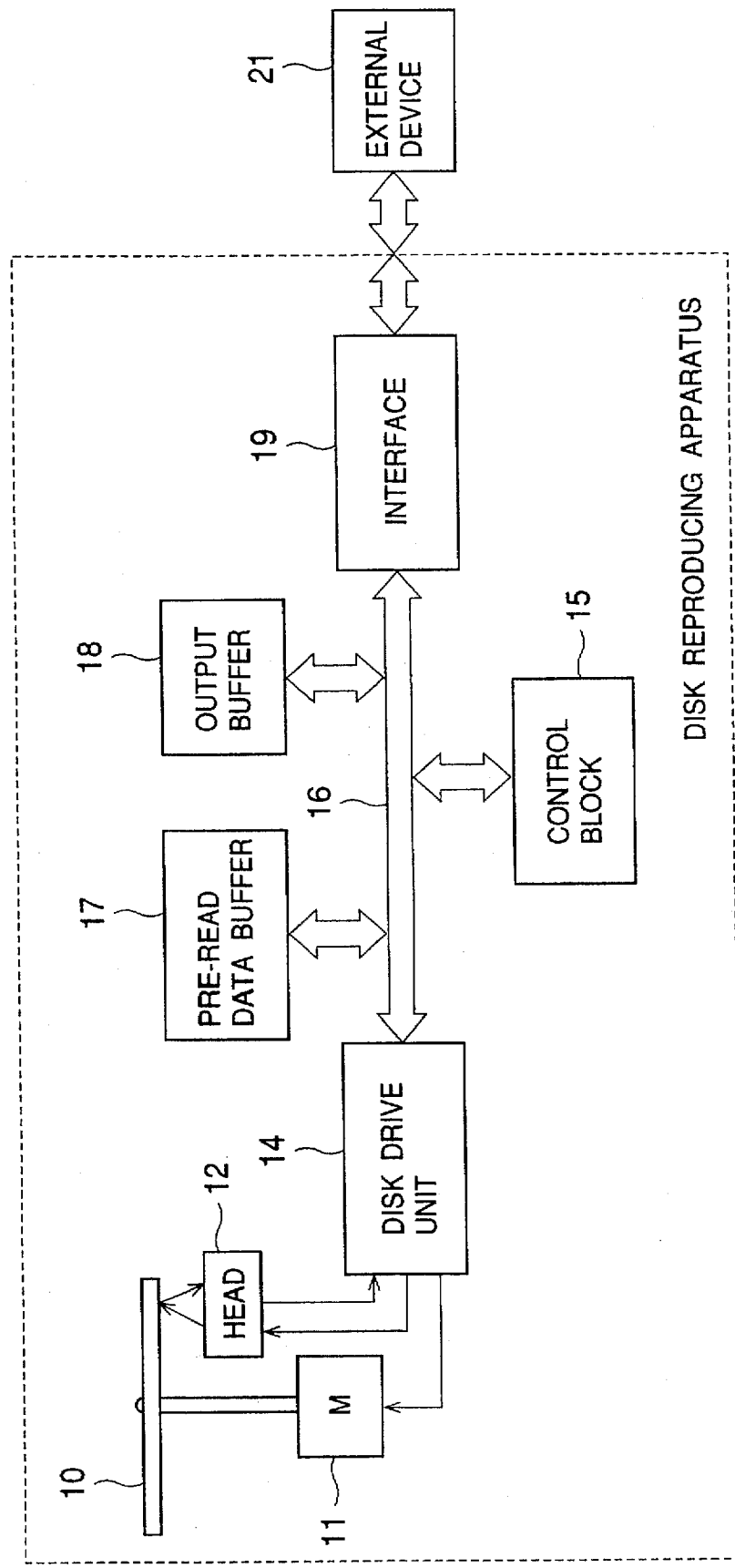
FIG. 3 is a block diagram of a disk apparatus according to an embodiment of the present invention.

FIG. 3 is a block diagram of an apparatus for reproducing data from a disk according to the first embodiment of the present invention. In FIG. 3, the reference number 10 indicates a CD-ROM on which data of video and sound of a game is recorded. The CD-ROM is rotated by a spindle motor 11 at a constant linear velocity. Data is reproduced from the CD-ROM 10 by means of an optical head 12. Under the control of a control block 15, a disk drive unit 14 performs a revolution control of the spindle motor 11 so that it rotates at a constant linear velocity, and controls a seek operation and tracking of the optical head 12 so that data stored in a storage area of the CD-ROM 10 specified a desired address can duly be reproduced. Further, the disk drive unit 14 demodulates a reproduced signal supplied from the optical head 12 to output resultant digital data.

The disk drive unit 14 is connected, via a bus 16, to the control block 15 serving as a select/output part, a pre-read data buffer (interseek use) 17 serving as a first buffer (storage area), an output buffer 18 serving as a second buffer (storage area), and an interface 19. The pre-read data buffer 17 and the output buffer 18 may be structured by individual memory chips or a single memory chip. The control block 15 stores directory information reproduced at the commencement of the reproduction of data from the CD-ROM 10, and determines, on the file basis, whether data stored in the file specified by the file name contained in the stored directory information is ordinary data or interseek data (pre-read data). For example, the file name indicates pre-read data if its initial character is S and indicates ordinary data if its initial character is other than S. In the first embodiment of the present invention, the ordinary data is data sequentially recorded on a storage area, and does not need the seek operation of the head 12 in order to read the ordinary data. The pre-read data is data forming the beginning part of the data recorded on a storage area which discontinues the storage area on which the data is sequentially recorded. Data continuing to the data forming the above beginning part is ordinary data and is sequentially recorded.

The control block 15 stores data reproduced from the CD-ROM 10 in the data pre-reading buffer 17 if it is pre-read data, and stores the data in the output buffer 18 if it is ordinary data. Further, the control block 15 determines whether data requested by an external device 21, which may be the main body of a game machine, is pre-read data or ordinary data, reads the requested data from the pre-read data buffer 17 or the output buffer 18, and supplies the read data to the external device 21 via the interface 19.

Figure 4:
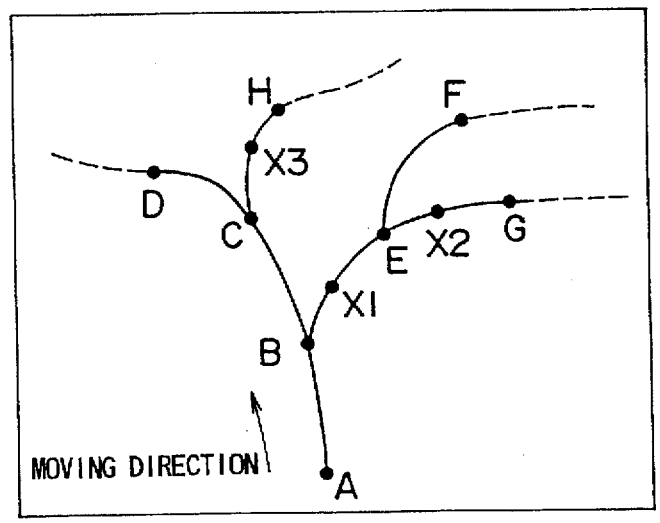
FIG. 4 is a diagram for explaining a course displayed on a screen in a play of a driving game.

The arrangement of video and sound data recorded on the CD-ROM 10 will be described by referring to an example of a driving game shown in FIG. 4, in which a route AB is run and thereafter it can branch into a route BC or BE, the route BC can branch into a route CD or CH after running the route BC, and the route BE can branch into a route EF or EG after running the route BE.

Figure 5:
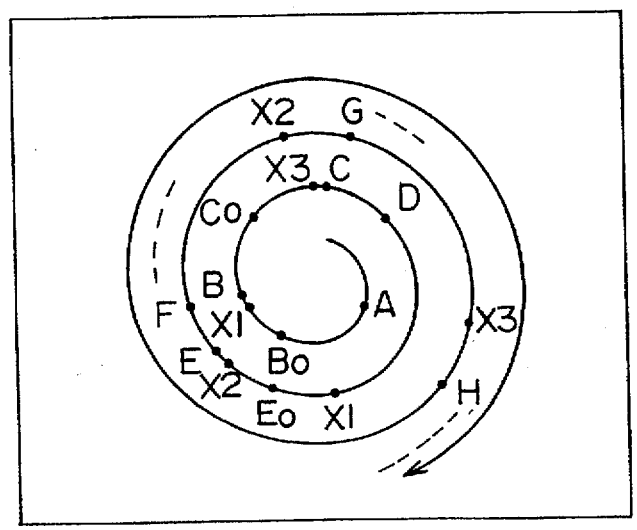
FIG. 5 is a diagram for explaining a recording formation according to a first embodiment of the present invention.

In this case, data is recorded on a spiral track formed on the CD-ROM 10 starting from the inner circumference side thereof according to the first embodiment of the present invention shown in FIG. 5. More particularly, data regarding the route AB is recorded, as ordinary data, on a storage area specified by continuous address values. In this storage area, data regarding route B0X1, which is a beginning part of the route BE, is recorded as pre-read data. Following the data regarding the route AB, data regarding the route BC is recorded, as ordinary data, on a storage area specified by continuous address values. In this storage area, data regarding route C0X3, which is a beginning part of the route CH, is recorded as pre-read data. Next, data regarding the route CD is recorded as ordinary data. After the route CD, data regarding a route X1E, which is the remaining part of the route BE, is stored as ordinary data. In the storage area on which the data regarding the route X1E is recorded, data regarding a route E0X2, which is the beginning part of the route EG, is recorded as pre-read data. Next, data regarding the route EF is recorded as ordinary data. Further, data regarding a route X2G, which is the remaining part of the route EG, is recorded as ordinary data, and continuously data regarding a route X3H that is the remaining part of the route CH is recorded as ordinary data. The times respectively necessary to reproduce data regarding the routes B0X1, E0X2, and C0X3 are equal to or longer than the times respectively necessary to start the reproduction after initiating the seek operation at the positions B, E and C to seek the addresses of the storage areas on which the respective data regarding the routes X1E, X2G and X3H are recorded.

Figure 6:
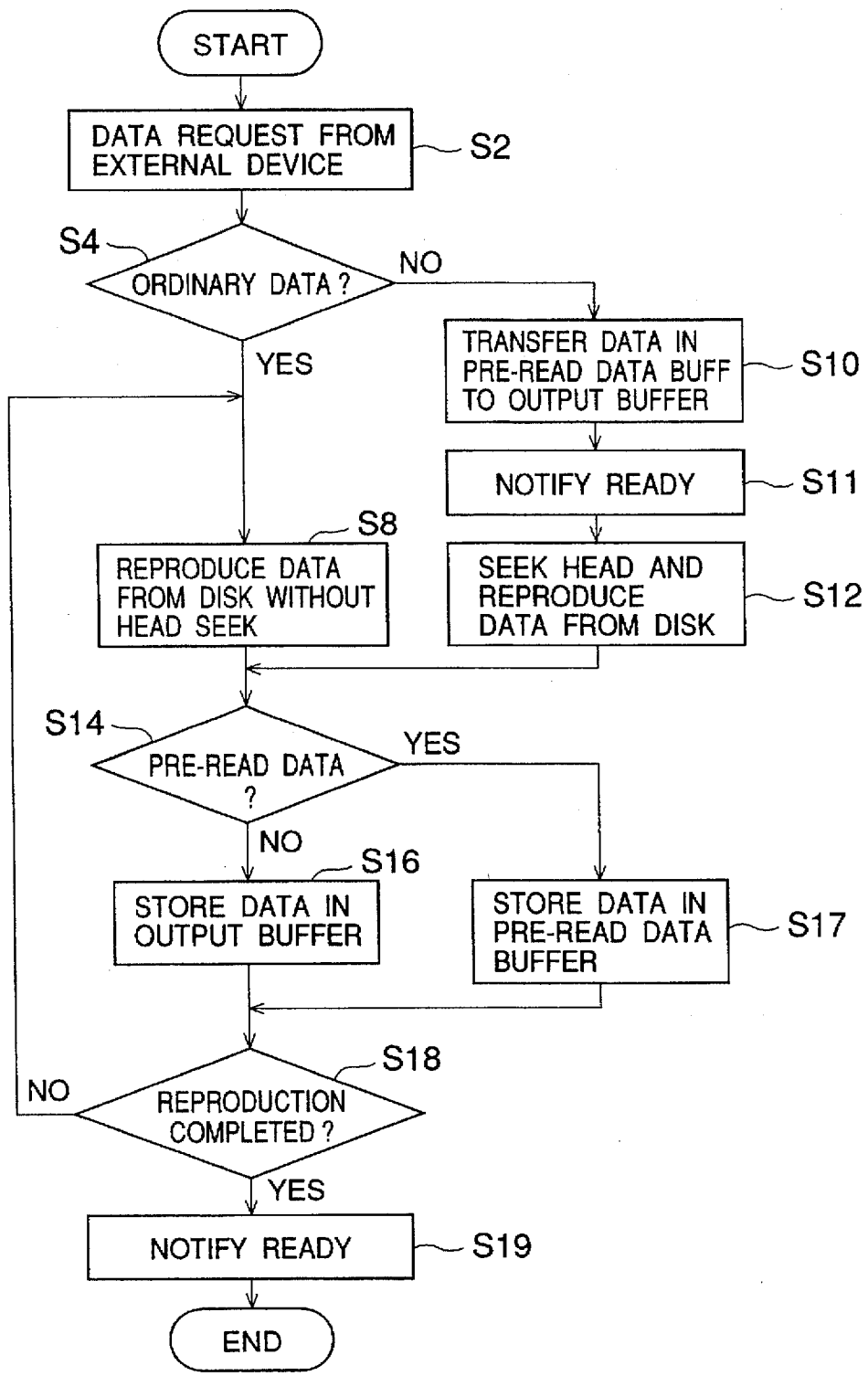
FIG. 6 is a flowchart of a process executed by a control block shown in FIG. 3 according to the first embodiment of the present invention.

FIG. 6 is a flowchart of a process executed by the control block 15 when reading the CD-ROM 10 on which data is recorded in the formation shown in FIG. 5. The process is initiated by an interrupt from the external device 21. The control block 15 receives a data read request supplied from the external device 21 in step S2, and determines, in step S4, whether or not the data requested to be read is ordinary data. The external device 21 is, for example, a game machine. The game machine has a CPU, a memory, an external interface and so on, and is used together with a display and a control pad unit. The above request to read data is output, for example, when the operator operates the control pad unit and selects a course displayed on the screen.

When the read data is ordinary data, data is sequentially recorded and no seek operation is needed. Hence, the control block 15 proceeds with step S8, in which data is sequentially reproduced from the CD-ROM 10 without any seek operation.

When it is determined, in step S4, that the read data is pre-read data, the control block 15 reads the requested data from the pre-read data buffer 17 and transfers it to the output buffer 18 in step S10 because the address changes discontinuously. Further, in step S11 the control block 15 notifies the external device 21 that the control block 15 is now ready to provide the requested data. By this notification, the external device 21 reads the requested data stored in the output buffer 18 via the interface 19. In step S12 subsequent to step S11, the control block 15 seeks the route following the pre-read requested data and reproduces data regarding the above route. For example, when data regarding the route BE1 is requested, the starting point X1 of the address specifying the storage area on which data regarding route X1E is recorded is sought.

The control block 15 proceeds with step S14 after executing step S8 or step S12, and determines whether or not data reproduced from the CD-ROM 10 is pre-read data. If the reproduced data is ordinary data, the control block 15 stores the reproduced data in the output buffer 18 in step S16. If the reproduced data is pre-read data, in step S17 the control block 15 stores the reproduced data in the pre-read data buffer 17.

Thereafter, the control block 15 determines, in step S18, whether reproduction of the requested data is completed. The control block 15 proceeds with step S8 to continue the data reproduction when reproduction of the requested data is incomplete, and proceeds with step S19 when reproduction of the requested data is completed. In step S19, the control block 15 notifies the external device 21 that the requested data is now ready to be provided, and then ends the process. The external device 21 receives the above notification, and then reads the requested data stored in the output buffer 18.

Hence, at the time when the external device 21 requests data regarding the route BE after the data regarding the route AB is read, the data regarding the route B0X1 is already stored in the pre-read data buffer 17. The above data is transferred to the output buffer 18 in step S10, and is output to the external device 21 via the interface 19. During the above, the data regarding the route X1E is sought, reproduced and stored in the output buffer 18. The data regarding the route X1E is supplied to the external device 21 continuously following the reading of the data regarding the route B0X1. When the external device 21 requests data regarding the route BC after reading the data regarding the route AB, the data regarding the route BC is reproduced, stored in the output buffer 18 and is then transferred to the external device 21 via the interface 19. That is, even if the route BC or BE is selected, the video and sound of the route BC or BE can be obtained so that they continue the video and sound of the route AB without any interruption or stop of supply of video and sound during the seek operation of the optical head 12.

The pre-read data regarding the routes B0X1, C0X3 and E0X2 may be placed anywhere before, after or in the ordinary data regarding the routes AB, BC and XE1, and may be integrally or distributively arranged.

Figure 7:
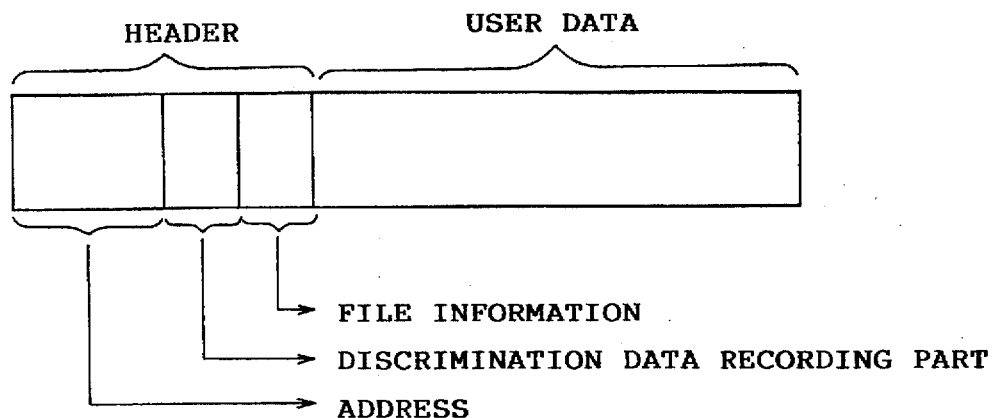
FIG. 7 is a diagram showing a data format recorded on a disk.

The determinations in steps S4 and S14 shown in FIG. 6 may be carried out by referring to discrimination data stored in a discrimination data recording part shown in FIG. 7 instead of the aforementioned method using the file name. FIG. 7 is a diagram of a format of information recorded on the CD-ROM 10. The recorded information includes a header and user data. The header includes an address, the discrimination data recording part and file information. The discrimination data recording part includes discrimination data indicating whether subsequent user data is ordinary data or pre-read data. The control block 15 shown in FIG. 3 refers to the discrimination data and performs the determinations of steps S4 and S14.

When the aforementioned file name is used, the determinations can be performed by referring to the file information, and the discrimination data recording part is not needed. When the file information indicates the beginning character S of the file name, the control block 15 determines that the data is pre-read data.

Figure 8:
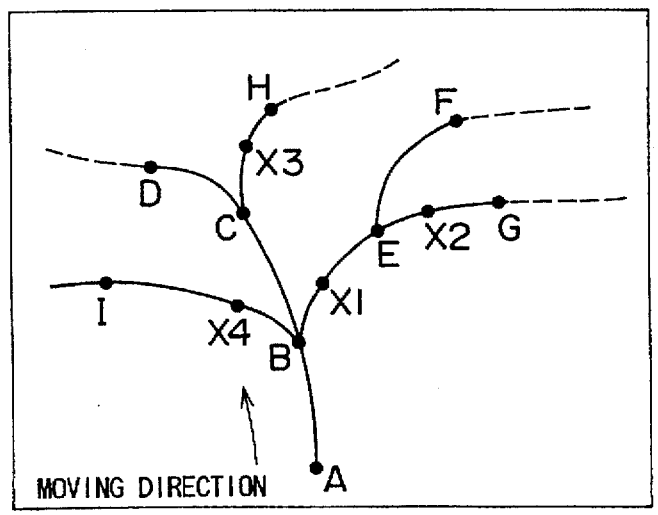
FIG. 8 is a diagram showing a course displayed on the screen in play of the driving game.
Figure 9:
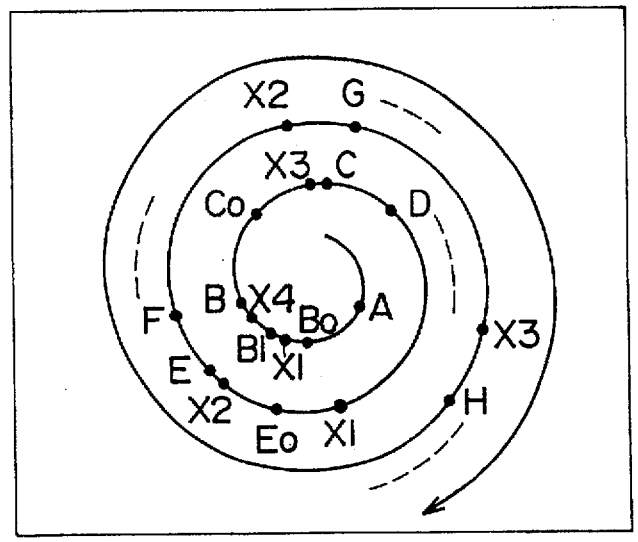
FIG. 9 is a diagram for explaining a recording formation used when the course shown in FIG. 8 is displayed according to the first embodiment of the present invention.

The process shown in FIG. 6 according to the first embodiment of the present invention can process a case as shown in FIG. 8 in which two or more branching routes are available at a branching point. In the case shown in FIG. 8, two branching routes BE and BI are available at branching point B. In this case, as shown in FIG. 9, pre-read data regarding routes B0X1 and B1X4 are recorded between items of the data regarding the route AB. The pre-read data regarding the routes B0X1 and B1X4 have respective lengths which make it possible to continuously obtain data from the buffer while the head 12 seeks the beginning address of the route X1E0 or X4I0. In FIG. 8, the data regarding the route AB is recorded between the pre-read data regarding the route B0X1 and the pre-read data regarding the route B1X4. Alternatively, the pre-read data regarding the routes B0X1 and B1X4 may be continuously recorded.

Figure 10:
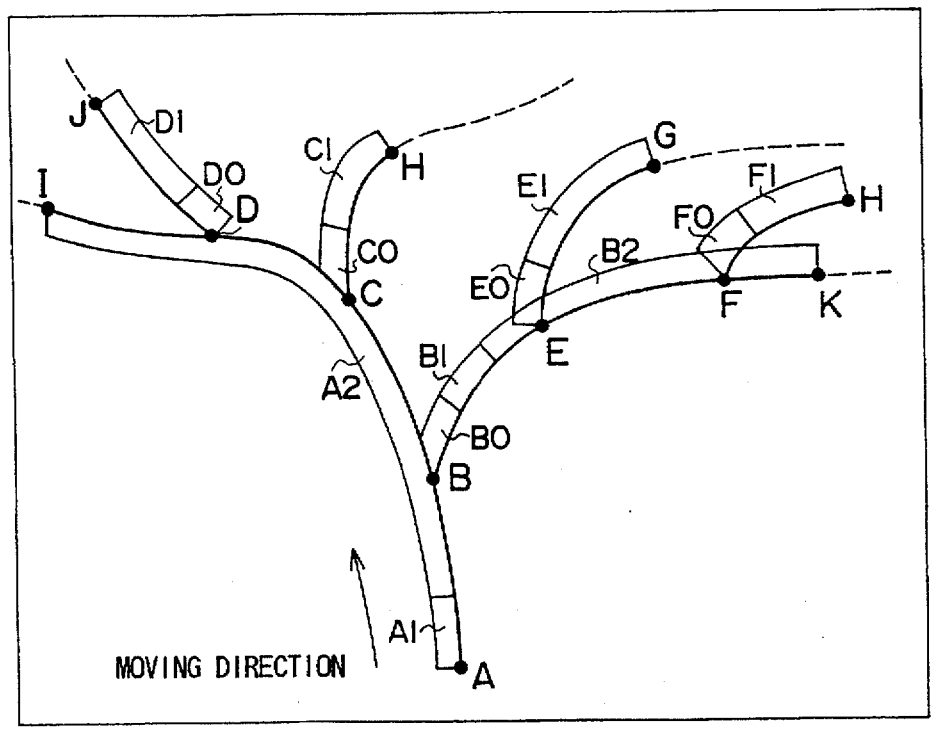
FIG. 10 is a diagram of a course displayed on the screen in play of the driving game and an example of data relating to the above course.

The process shown in FIG. 6 can be applied to a case as shown in FIG. 10 in which a plurality of branching points are available in one route by recording files on the CD-ROM 10 as shown in FIGS. 11 and 12. In FIG. 10, there are three branching points B, C and D in a route AI. There are two branching points E and F in a route BK. The route AI has data A1 and A2, and the route BK has data B0, B1 and B2. A route CH has data C0 and C1, and a route DJ has data D0 and D1. A route EG has data E0 and E1, and a route FH has data F0 and F1.

In this case, files are defined as shown in FIGS. 11 and 12. A file A relates to the route AI, and includes data A1 and A2, and data B0, C0 and D0 placed between the data A1 and the data A2 (FIG. 11 and part (A) of FIG. 12). The data B0, C0 and D0 are pre-read data. The data A1 has an area (data length) enough to prevent occurrence of an interruption of reading data regarding the file A (data forming the route AI) during the time when the pre-read data B0, C0 and D0 are read. The read data A1 and A2 are stored in the output buffer 18 (FIG. 3) shown in FIG. 3 (step S16 shown in FIG. 6), and the pre-read data B0, C0 and D0 are respectively stored in the pre-read data buffer 17 (FIG. 3).

The file B relates to the route BK, and includes data B1 and B2 and data E0 and F0 placed between the data B1 and the data B2 (FIG. 11 and part (B) of FIG. 12). The data E0 and F0 are pre-read data. The data B1 has an area (data length) enough to prevent occurrence of an interruption of reading data regarding the file B (data forming the route BK) during the time when the pre-read data E0 and F0 are read. The file C relates to the route CH, and includes only data C1 (FIG. 11 and part (C) of FIG. 12).

The operation of the first embodiment of the present invention with respect to the above case is as follows. First, the data A1 is read from the CD-ROM 10 and is written into the output buffer 18 (steps S8, S14 and S16 shown in FIG. 6). During this process, it is not allowed to branch into any of the routes BE, CH and DJ. Next, the pre-read data B0, C0 and D0 are read from the CD-ROM 10, and are written into the pre-read data buffer 17 (steps S8, S14 and S17). At any time after the above process, branching is allowed. If there is no need for branching, data A2 is read from the CD-ROM 10, and is written into the output buffer 18.

Figure 13:
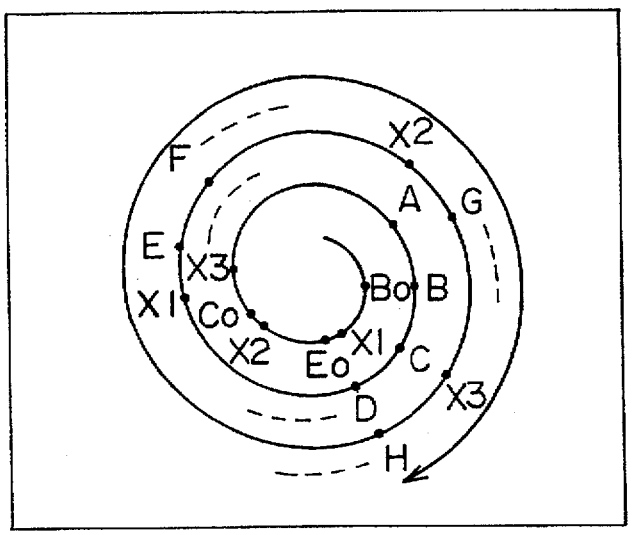
FIG. 13 is a diagram for explaining a recording formation according to a second embodiment of the present invention.

FIG. 13 shows a CD-ROM recording sequence according to a second embodiment of the present invention. In FIG. 13, data regarding routes B0X1, E0X2 and C0X3 are recorded, as pre-read data, on the CD-ROM 10 starting from the inner circumference side of the spiral track formed thereon. Subsequently, data regarding routes AB, BC and CD are recorded as ordinary data. Subsequently, data regarding routes X1E and EF are recorded as ordinary data, and then data regarding a route X2G is recorded as ordinary data. Subsequently, data regarding a route X3H is recorded as ordinary data. According to the second embodiment of the present invention, the CD-ROM 10 is sequentially scanned from the inner circumference side to the outer circumference side, and the above pre-read data are read before the ordinary data are read. A group of the pre-read data can be recorded on any position on the CD-ROM 10.

Parts (A) and (B) of FIG. 14 are flowcharts of processes executed by the control block 15 when data recorded in the formation shown in FIG. 13 is reproduced from the CD-ROM 10.

The process shown in part (A) of FIG. 14 is executed after reproducing the directory of the CD-ROM 10. In step S22, the recording area for the pre-read data is sought, and in step S24 the pre-read data is reproduced. In step S26, the control block 15 determines whether the pre-read data is reproduced. When the pre-read data is reproduced, the reproduced data is stored in the pre-read data buffer 17 (step S26), and the process proceeds with step S24. Then, the steps S24–S28 are repeatedly carried out. When it is determined, in step S26, that the read data is ordinary data, the process is ended.

The process shown in part (B) of FIG. 14 is initiated by an interrupt from the external device 21. In this figure, in step S32, the control block 15 receives a data read request supplied from the external device 21, and determines, in step S34, whether the requested data is ordinary data.

When it is determined that the ordinary data is read, the process proceeds with step S36 in which data is sequentially read from the CD-ROM 10 without any seek operation on the optical head 12.

When it is determined, in step S34, that the pre-read data is read, the control block 15 reads the requested data from the pre-read data buffer 17 and transfers it to the output buffer 18 in step S38. In step S40, the control block 15 notifies the external device 21 that it is now ready to transfer the requested data to the external device 21. In step S42, the control block 15 accesses the route subsequent to the requested pre-read data by the seek operation and reproduces data therefrom. For example, if data regarding the route BE1 is requested by the external device 21, sought is the starting point of the address specifying the storage area in which the data regarding the route X1E is stored.

After executing step S36 or step S42, the control block 15 stores the data reproduced in step S44 in the output buffer 18, and determines, in step S46, whether reproduction of the requested data is completed. When the reproduction is not yet completed, the control block 15 proceeds with step S36 to continue the data reproduction. When the reproduction is completed, in step S48 the control block 15 notifies the external device 21 that it is now ready to transfer the requested data to the external device 21, and then ends the process.

Even when either the route BC or BE is selected in the second embodiment of the present invention, the video and sound of the route BC or BE can be obtained continuously with respect to the video and sound of the route AB. However, the second embodiment needs a large capacity of the pre-read data buffer 17, as compared to the first embodiment thereof. It may be possible for the external device 21 to directly read the pre-read data from the pre-read data buffer 17 without any transfer to the output buffer 18.

Figure 15:
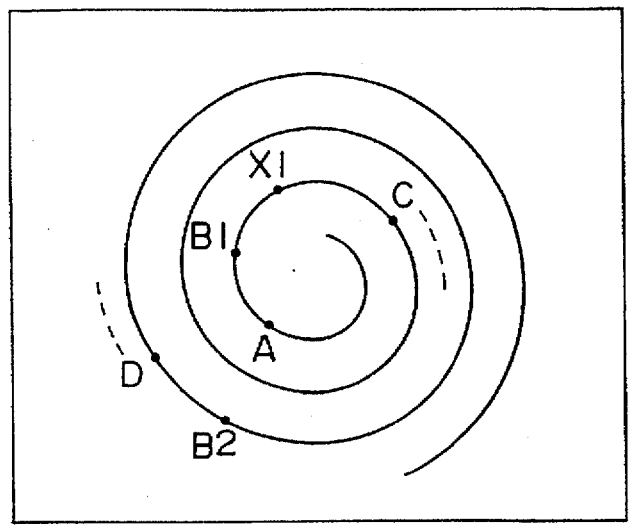
FIG. 15 is a diagram for explaining a recording formation according to a third embodiment of the present invention.
Figure 16:
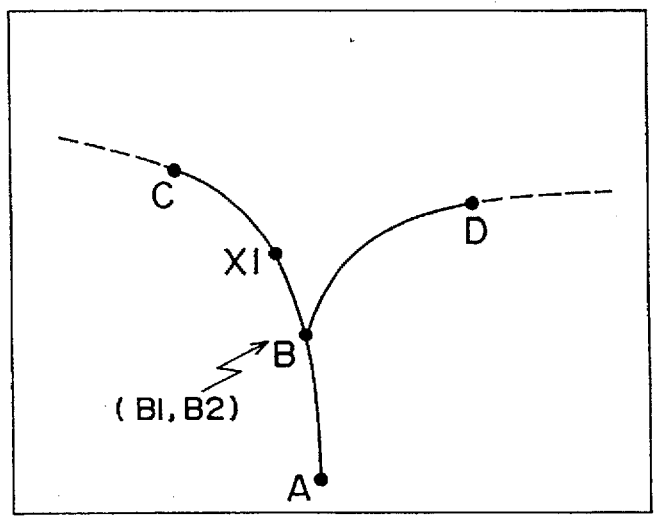
FIG. 16 is a diagram showing a course displayed on the screen according to the recording formation shown in FIG. 15.

FIG. 15 shows a sequence of recording data (video data and sound data) regarding a course shown in FIG. 16 on the CD-ROM. The data regarding the route AC is continuously recorded on the CD-ROM, and data regarding the route BD branching at a branching point B on the route AC is recorded independently of the data regarding the route AC. The above recording formation is conventionally used. The third embodiment of the present invention which will be described below is intended to provide a method capable of continuously reading data from the CD-ROM even when the CD-ROM having the recording formation shown in FIG. 15 is used.

Figure 17:
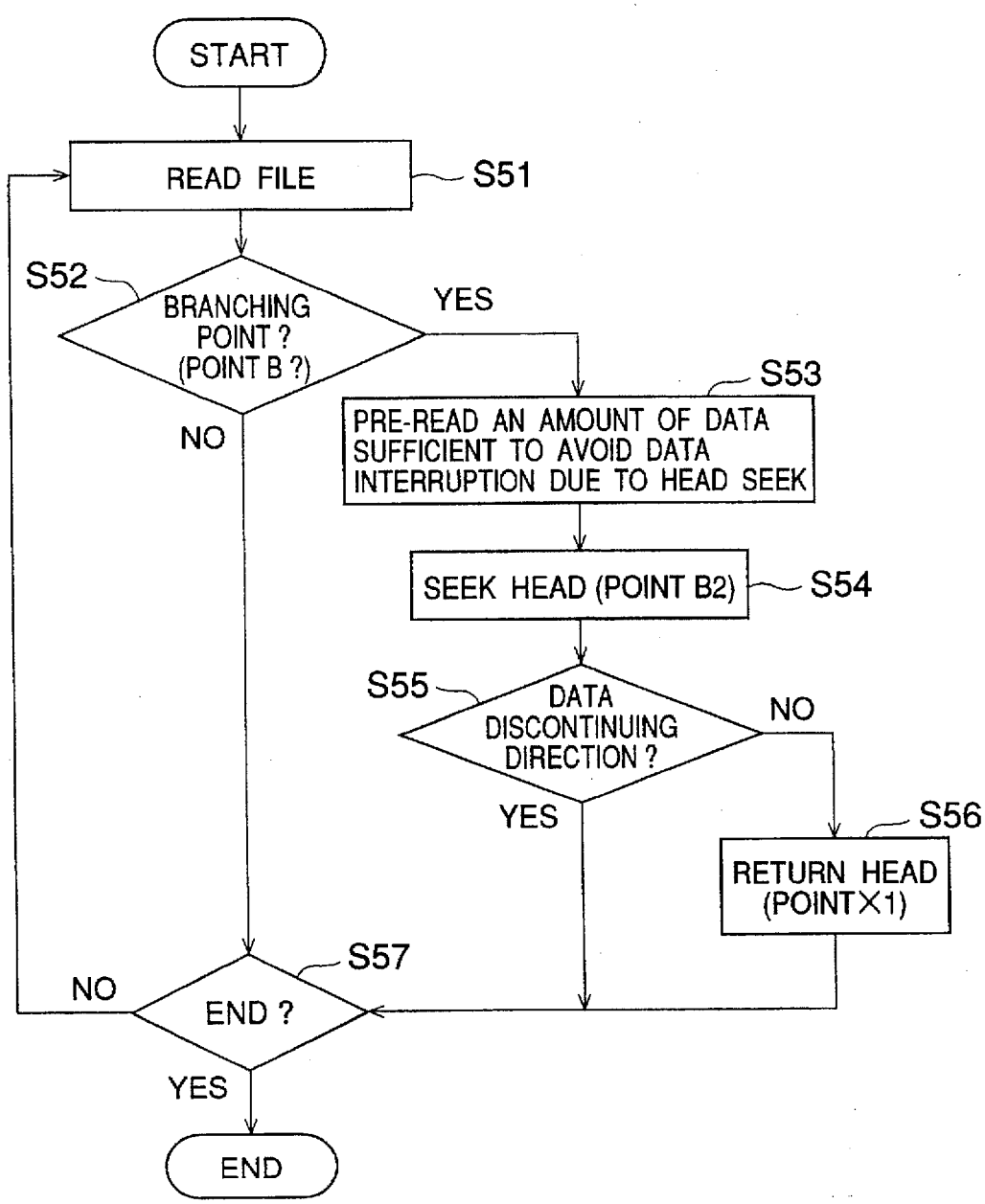
FIG. 17 is a flowchart of a process executed by the control block shown in FIG. 3 according to the third embodiment of the present invention.

FIG. 17 is a flowchart of a process executed by the control block 15 shown in FIG. 3 when reproducing data from the CD-ROM 10 having the recording formation shown in FIG. 15. In the third embodiment of the present invention, the pre-read data buffer 17 shown in FIG. 3 is not needed. That is, data read from the CD-ROM 10 is all stored in the output buffer 18.

In step S51, data (file data) is read from the CD-ROM 10. In step S52, the control block 15 searches for a branching point in a way which will be described later. In the example shown in FIG. 16, the branching point B is detected. When data being accessed is not related to any branching point, the control block 15 determines, in step S57, whether the process can be ended. When the determination result of step S57 is NO, the control block 15 recognizes that there is file data to be read, and returns to step S51. When the determination result of step S57 is YES, the control block 15 ends the process.

When the control block 15 determines, in step S52, that a branching point is detected, in step S53 the control block 15 pre-reads, as pre-read data, data having an amount which can avoid an interruption of supplying data due to the seek operation on the head 12. In the example shown in FIGS. 15 and 16, data arranged from the branching point B to point X1 is pre-read. In step S54, the control block 15 initiates the seek operation and moves the head 12 to point B2 shown in FIG. 15. The point B2 is the starting point of the route BD, and corresponds to the branching point B shown in FIG. 16. When a data request from the external device 21 indicates the route BD, the control block 15 proceeds with step S57. Hence, it is possible to continuously output the data regarding the route AB and the data regarding the route BD. When the data request from the external device does not indicate the route BD, in step S56 the control block 15 initiates the seek operation and moves the head 12 to the point X1 shown in FIG. 15. During the time when the head 12 is being moved from the point B2 shown in FIG. 15 to the point X1, it is possible to output the pre-read data up to the point X1 in step S53. Hence, it is possible to avoid any interruption of the video and sound located in the section BX1 when the head 12 is in the seek operation.

Figure 18:
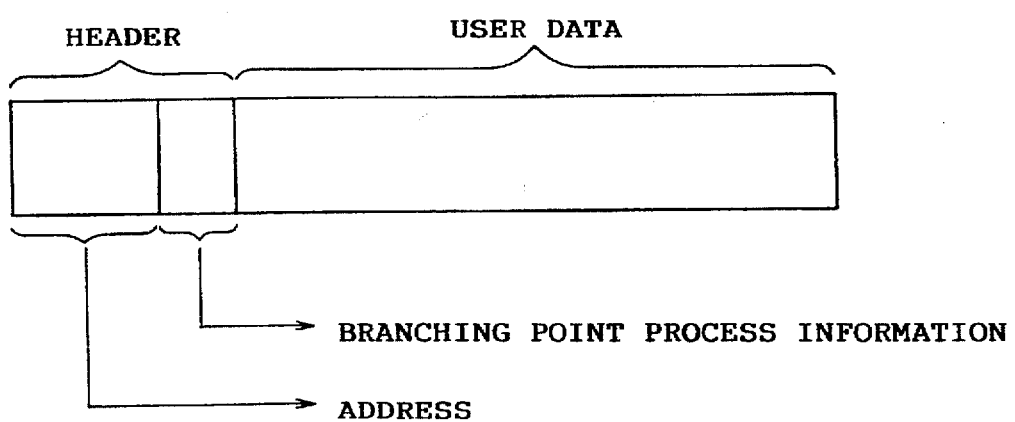
FIG. 18 is a diagram showing a format of data recorded on a disk.

FIG. 18 shows a format of data used in the third embodiment of the present invention. Data has a header and user data. The header has an address and branching point process information. The branching point information is information used to make a decision in step S52 shown in FIG. 17. The branching point information contains time information indicating that the branching point process in step S52 (FIG. 17) should be executed after a file is read for a predetermined time (such and such minutes and such and such seconds), and information concerning the seek destination of the head 12. The control block 15 shown in FIG. 3 refers to the branching point information, and makes a decision in step S52 shown in FIG. 17. It is possible to place the branching point information in a program rather than providing it in the header shown in FIG. 18. It is also possible to perform a management using sectors (management of the sector number) instead of the time information.

Figure 19:
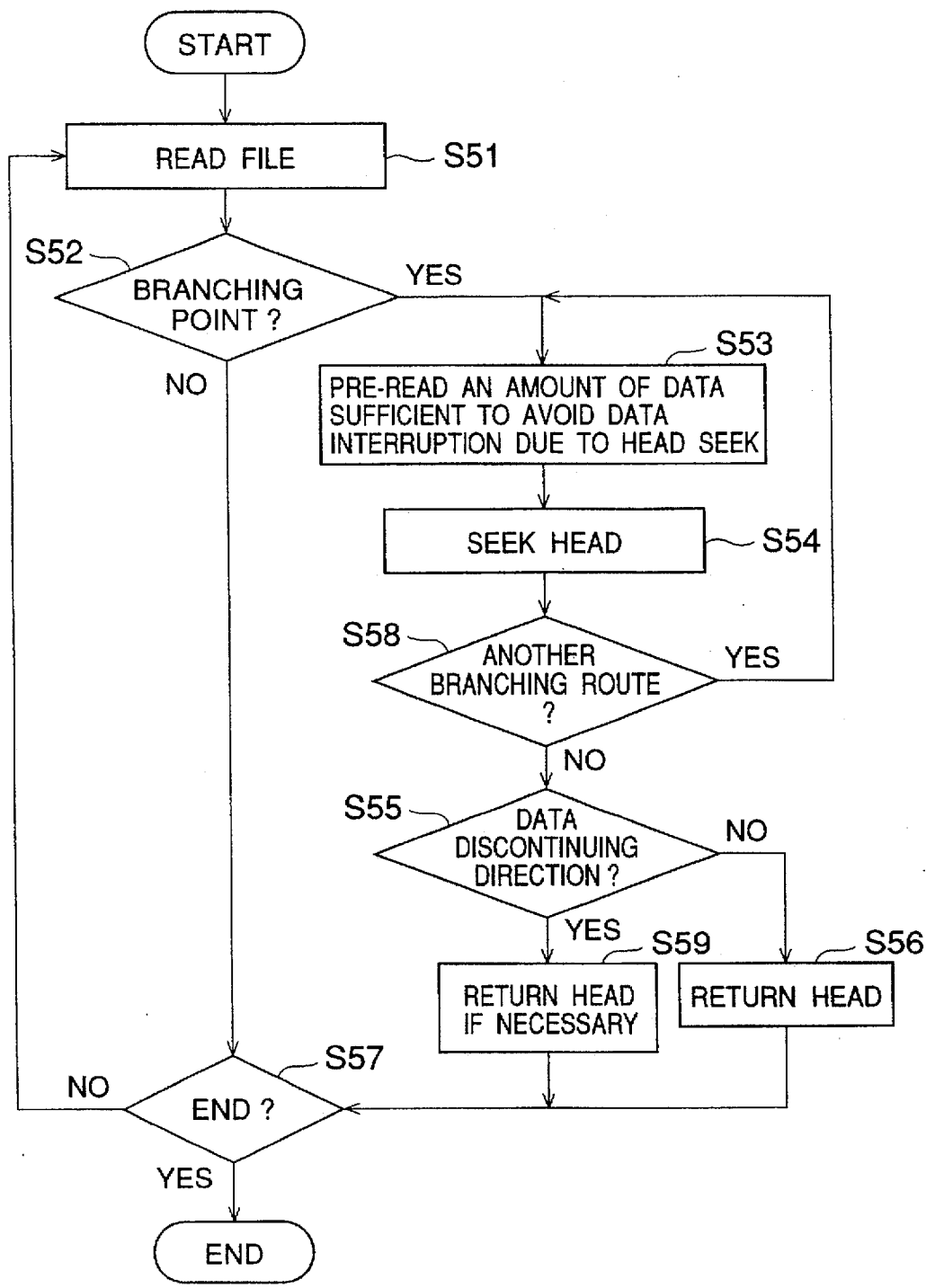
FIG. 19 is a diagram of a variation of the third embodiment of the present invention.
Figure 20:
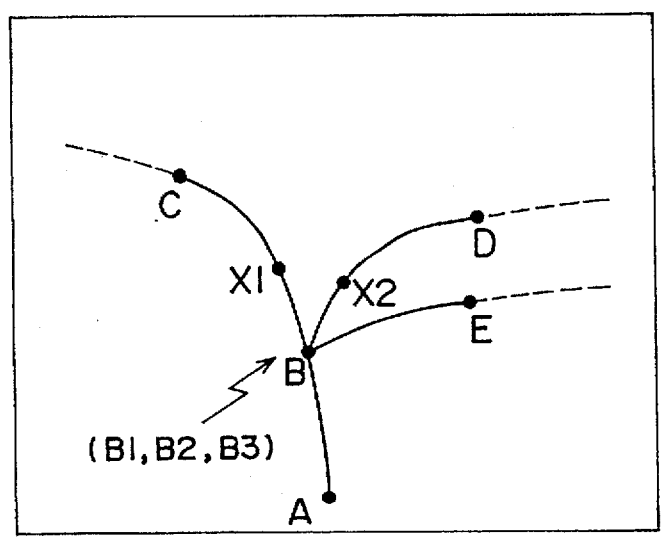
FIG. 20 is a diagram showing a course displayed on the screen in play of the driving game.
Figure 21:
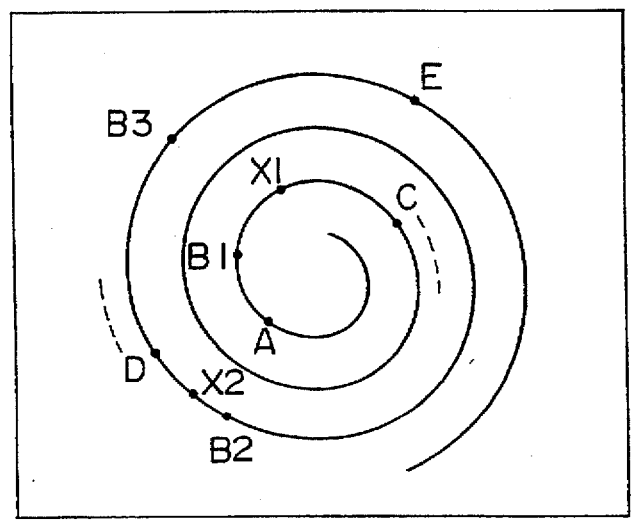
FIG. 21 is a diagram for explaining a recording formation used when the course shown in FIG. 20 is displayed according to the variation of the third embodiment of the present invention.

FIG. 19 shows a variation of the third embodiment of the present invention shown in FIG. 17. The process shown in FIG. 19 is obtained by adding steps S58 and S59 to the process shown in FIG. 17. The process shown in FIG. 19 is effective to a case as shown in FIG. 20 in which a plurality of branching routes are available at a branching point. In the routes shown in FIG. 20, data is recorded on the CD-ROM 10 as shown in FIG. 21. In FIGS. 20 and 21, point B3 is the starting point of the route BE on the CD-ROM 10. In step S58, the control block 15 makes the head 12 seek in step S54 and then determines whether a route other than the route being considered is available at the branching point.

In the case shown in FIGS. 20 and 21, the data regarding the section B1X1 on the CD-ROM 10 is pre-read, and the head 12 is moved to the point B2 on the CD-ROM 10. Since it is determined, in step S58, that another branching route, that is, the route BE is available, the control block 15 returns to step S53, and pre-reads data in the section B2X2 on the CD-ROM 10. Then, in step S54, the control block moves the head 12 to the branching point B shown in FIG. 20, that is, the point B3 shown in FIG. 21. In step S56, if the route BC is requested in step S55, the control block 15 returns the head 12 to the point B1 on the CD-ROM 10. When a data discontinuing direction, that is, the route BD or BE is selected, the control block 15 returns the head 12 to the previous seek operation starting position, and ends the process (S57) to continuously perform the data read operation. In the example shown in FIGS. 20 and 21, if the route BE is selected, it is not necessary to return the head 12. If the route BD is selected, the control block 15 moves the head 12 from the point B3 on the CD-ROM 12 to the point X2.

In an alternative of the structure shown FIG. 3 in which the pre-read data is transferred to the output buffer 18 from the pre-read data buffer 17 and the external device 21 reads the data from the output buffer 18, a buffer may be provided in, for example, the interface 19, and the data may be transferred from the pre-read data buffer 17 and the output buffer 18 to the buffer in the interface 19, so that the external device 21 can read the data from the buffer built in the interface 19. It is also possible for the external device 21 to read the pre-read data directly from the pre-read data buffer 17 without any transfer via the output buffer 18.

The CD-ROM 10 having the data arrangements shown in FIGS. 5, 9 and 13 is a disk proposed by the present invention, and the data recording method for such a disk includes a first step of recording sequential data on a disk, a second step of recording data on a recording area located in a position discontinuous to the recorded part in which the sequential data is recorded, and a third step of recording, on a predetermined recording area, data which forms a beginning part followed by the data recorded on the above recording area located in the discontinuous position and which is to be read in advance of reading the data recorded in the second step. The first, second and third steps can be executed in an arbitrary sequence. It is sufficient that the data arrangements shown in FIGS. 5, 9 and 13 can be obtained as a result of recording data.

INDUSTRIAL APPLICABILITY

As describe above, according to the apparatus and method for reproducing data from a disk, the method for recording data on a disk, and a disk of the present invention, it is possible to continuously read data without any interruption of outputting data even during a time when a head is being moved by the seek operation to read data recorded in a discontinuous recording area. It is possible to avoid any interruption of video or sound at the time of selecting a branching route when playing a driving game or the like in the state in which the apparatus is connected to the game machine main body. Hence, the present invention is very effective to practical use.

I claim:
1. A disk recording method for recording data on a disk comprising:
   a first step of recording sequential data on the disk;
   a second step of recording data on a recording area located in a position discontinuous to the recorded part on which the sequential data is recorded; and
   a third step of recording, on a predetermined recording area, data which forms a beginning part to be followed by the data recorded on said recording area located in the discontinuous position and which is to be read in advance of reading the data recorded in the second step.

2. The disk recording method as claimed in claim 1, wherein said third step is a step of recording the data regarding said beginning part on the recording area on which said sequential data is recorded.

3. The disk recording method as claimed in claim 1, wherein said third step is a step of recording the data regarding said beginning part on a storage area to be accessed prior to access to said recording area on which said sequential data is recorded.

4. A disk for recording data comprising:
   a first recording area on which sequential data is recorded;
   a second recording area located in a position discontinuous to the first recording area on which said sequential data is recorded; and
   a third recording area for recording data regarding a beginning part to be followed by data recorded on said second recording area and to be read in advance of reading the data from the second recording area.

5. The disk as claimed in claim 4, wherein said third recording area is provided in said first recording area.

6. The disk as claimed in claim 4, wherein said third recording area is located in a position to be accessed in advance of accessing said first recording area.

* * * * *

UNITED STATES PATENT AND TRADEMARK OFFICE
CERTIFICATE OF CORRECTION

PATENT NO. : 5,745,474
DATED : 4/28/98
INVENTOR(S) : Hidetaka Owaki

It is certified that error appears in the above-identified patent and that said Letters Patent is hereby corrected as shown below:

On the title page, item [30], Priority Application Priority Data:
Insert the following:

--June 3, 1993  [JP]  Japan ............. 5-133560--; and
--June 3, 1994  [JP]  Japan ............. PCT/JP94/00897--.

Signed and Sealed this

Sixteenth Day of February, 1999

Attest:

*Acting Commissioner of Patents and Trademarks*

*Attesting Officer*

UNITED STATES PATENT AND TRADEMARK OFFICE
CERTIFICATE OF CORRECTION

PATENT NO. : 5,745,474
DATED : April 28, 1998
INVENTOR(S) : Hidetaka Owaki

Page 1 of 2

It is certified that error appears in the above-identified patent and that said Letters Patent is hereby corrected as shown below:

On the title page, item [56],

In the References Cited Data:

Please insert the following for U.S. Patent Documents:

| Patent No. | Date | Name | Classification |
|---|---|---|---|
| --5,016,121 | 05/14/91 | Peddle et al. | 360/39-- |
| --5,179,684 | 01/12/93 | Tohchi et al. | 395/425-- |

Please insert the following for Foreign Patent Documents:

| Patent No. | Date | Country |
|---|---|---|
| --4-111015 | 4/1992 | Japan-- |
| --3-19148 | 1/1991 | Japan-- |
| --57-167108 | 10/1982 | Japan-- |
| --4-362585 | 12/1992 | Japan-- |
| --58-1861 | 1/1983 | Japan-- |

Please insert the following for Other Publications:

--Patent Abstracts of Japan for Publication No. 04-111015, April 13, 1992 for invention entitled "Information Recorder" by Kojima Nobuyuki.--

-- Patent Abstracts of Japan for Publication No. 57-167108, October 14, 1982 for invention entitled "Magnetic Disc Storage Device" by Nakagome Hiroshi.--

UNITED STATES PATENT AND TRADEMARK OFFICE
CERTIFICATE OF CORRECTION

PATENT NO.   : 5,745,474                                            Page 2 of 2
DATED        : April 28, 1998
INVENTOR(S)  : Hidetaka Owaki It is certified that error appears in the above-identified patent and that said Letters Patent is hereby corrected as shown below:

--Patent Abstracts of Japan for Publication No. 04-362585, December 15, 1992 for invention entitled "Data Reading Method for Disk Medium" by Ushijima Kei.--

-- Patent Abstracts of Japan for Publication No. 58-001861, January 7, 1983 for invention entitled "Disk Access Controlling System" by Ihara Tetsushige.--

Signed and Sealed this

Twenty-fifth Day of April, 2000

Attest:

Q. TODD DICKINSON

*Attesting Officer*                              *Director of Patents and Trademarks*